(12) United States Patent
Kunstle et al.

(10) Patent No.: US 8,393,448 B2
(45) Date of Patent: Mar. 12, 2013

(54) SPRING FORK

(75) Inventors: Reiner Kunstle, Metzingen/Neuhausen (DE); Dirk Lude, Metzingen (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 1117 days.

(21) Appl. No.: 12/161,743

(22) PCT Filed: Feb. 23, 2007

(86) PCT No.: PCT/EP2007/001600
§ 371 (c)(1),
(2), (4) Date: Jul. 22, 2008

(87) PCT Pub. No.: WO2007/101564
PCT Pub. Date: Sep. 13, 2007

(65) Prior Publication Data
US 2010/0219607 A1    Sep. 2, 2010

(30) Foreign Application Priority Data
Mar. 1, 2006 (DE) .......................... 10 2006 009 759

(51) Int. Cl.
*F16F 9/50* (2006.01)
(52) U.S. Cl. .................. 188/283; 188/282.6; 188/319.2; 188/300
(58) Field of Classification Search ............... 188/266.4, 188/282.5, 282.6, 283, 319.2, 299.1, 300
See application file for complete search history.

(56) References Cited

U.S. PATENT DOCUMENTS

| | | | |
|---|---|---|---|
| 4,813,519 A * | 3/1989 | Matsubara et al. ........ | 188/266.4 |
| 4,961,482 A | 10/1990 | Pohlenz et al. | |
| 4,986,393 A * | 1/1991 | Preukschat et al. ........ | 188/266.6 |
| 5,295,563 A | 3/1994 | Bennett | |
| 5,320,375 A * | 6/1994 | Reeves et al. ................. | 280/284 |
| 5,507,475 A | 4/1996 | Seel et al. | |
| 5,738,191 A | 4/1998 | Forster | |
| 5,848,675 A * | 12/1998 | Gonzalez ................... | 188/319.2 |

(Continued)

FOREIGN PATENT DOCUMENTS

| | | |
|---|---|---|
| DE | 1934840 | 3/1966 |
| DE | 2721933 | 11/1978 |

(Continued)

*Primary Examiner* — Bradley King
(74) *Attorney, Agent, or Firm* — Alan Kamrath; Kamrath IP Lawfirm, PA

(57) ABSTRACT

A spring fork, in particular for bicycles, with a suspension system and a hydraulic damping system, includes a compression stage damping system (6) for a spring deflection process and a traction stage damping system (5) for a rebound process. At least one piston (3, 16, 27) is provided, which is located in the cylinder (2), and at least one connecting channel (17, 17*a*) is provided which connects the cylinder chambers located on both sides of the piston and is intended for the overflow of hydraulic oil (21). The compression stage damping system (6), which is activated during the spring deflection process, can be blocked by closing the connecting passage (lockout). At least with the compression stage damping system (6) blocked and, if appropriate, also with the traction stage damping system (5) also blocked, a bypass channel (11, 20, 20*a*) which has a reduced cross-section in comparison to the connecting channel (17, 17*a*) is opened. As a result, the strong damping effect is largely maintained in particular during the rocking peddling action, but on the other hand, automatic return of the fork to its initial position (sag position) is made possible.

8 Claims, 4 Drawing Sheets

U.S. PATENT DOCUMENTS

| | | | |
|---|---|---|---|
| 5,971,116 A * | 10/1999 | Franklin | 188/282.4 |
| 6,120,049 A * | 9/2000 | Gonzalez et al. | 280/276 |
| 6,155,541 A | 12/2000 | Farris et al. | |
| 6,382,370 B1 | 5/2002 | Girvin | |
| 7,699,147 B2 | 4/2010 | Preukschat et al. | |
| 2002/0074197 A1* | 6/2002 | Preukschat et al. | 188/316 |
| 2005/0104320 A1 | 5/2005 | Wesling et al. | |
| 2007/0068752 A1* | 3/2007 | Chen | 188/316 |

FOREIGN PATENT DOCUMENTS

| | | |
|---|---|---|
| DE | 3813402 | 11/1989 |
| DE | 4303039 | 8/1993 |
| DE | 4328571 | 10/1994 |
| DE | 19512866 | 10/1996 |
| DE | 10252557 | 5/2004 |
| DE | 202004002954 | 7/2004 |
| DE | 10062999 | 5/2005 |
| DE | 202005012777 | 11/2005 |
| EP | 1531066 | 5/2005 |
| EP | 1628039 | 2/2006 |
| FR | 353087 | 9/1906 |
| GB | 2 263 959 A | 8/1993 |
| WO | 0115964 | 3/2001 |

* cited by examiner

SPRING FORK

BACKGROUND

The invention relates to a spring fork, particularly for bicycles, with a spring and a hydraulic damping system, with a compression stage damping system being provided for a spring deflection process and a traction stage damping system for a rebound process, having at least one piston located in a cylinder and at least one connecting passage connecting the cylinder spaces located on both sides of the piston, intended for the overflow of the hydraulic medium. The compression stage damping system, activated during the spring deflection process, can be blocked by closing the connecting channel (lockout).

Such lockout-settings result in an extremely high damping and, therefor, prevent the strong dipping of the frame and the rocking of the fork during any rocking peddling action, which is particularly used in uphill passages.

For this purpose, the compression stage damping system is blocked so that practically no spring deflection is possible. However, this has the result that the fork during ever so slight motions deflects increasingly farther. Thus, particularly when riding uphill, uncomfortable and also ineffective riding positions and a worsened seating position are given.

SUMMARY

The object of the present invention is to create a spring fork of the type mentioned at the outset, by which the above-mentioned disadvantages are avoided, and particularly, the disadvantages of a changed position of the fork and/or the frame occurring during rocking peddling actions are prevented.

In order to attain this object, it is provided that at least one bypass channel with a cross-section narrowed towards the connecting channel is opened in a blocked compression stage damping system.

The cross-section of the connecting channel or the throttling channel is sized such that the strong damping effect remains to a large extent, and on the other hand, an automatic return of the fork into its default position (sag position) is made possible. This return can occur within a few seconds, for example.

It is particularly beneficial that no operation is necessary for the reset actions, i.e. that they occur automatically.

According to a practical embodiment, the connecting channel and the bypass channel are arranged in the piston and can alternating be opened and closed.

Another embodiment provides that a closing element is provided at a connecting channel for a partial closing of the connecting channel to a cross-section equivalent to the bypass channel.

Depending on the embodiment of the spring fork and/or the damping system, any of the above-mentioned embodiments can optionally be used.

According to one embodiment of the invention, both the compression stage damping system as well as the traction stage damping system can be lockable, with at least one bypass channel being provided having a reduced cross-section in reference to the connecting openings.

When the lock is engaged, compression and rebound of the fork are both largely blocked. However, due to the existing bypass channel, the neutral position (sag) can be automatically set to different basic stress levels, for example. Even during uneven riding, the fork automatically adjusts to the sag level.

If this automatic adjustment is undesired, for example, due to different fundamental stress, a blocking valve may be provided serially in reference to a parallel switch comprising a compression state damping system and a traction stage damping system according to another aspect of the invention.

In this case, the compression stage damping system and the traction stage damping system are both completely blocked. In this embodiment, when the lock is disengaged, any intermediate position of the fork can be adjusted by an appropriately different stress and can be fixed by engaging the lock. The fork is then locked to the respective position.

Another embodiment according to the invention provides that optionally only the compression stage damping system is blocked entirely or with a bypass, or both the pressure stage damping system and the traction stage damping system are blocked. In the latter case, both a blockage with a bypass or a complete blockage can be provided.

When several different settings are provided with regard to the damping adjustment, it is beneficial to provide a remote control for switching the spring fork to said different operating conditions.

This way, switching or adjustments to different terrain conditions can occur during the ride, without stepping down.

BRIEF DESCRIPTION OF THE DRAWINGS

In the following, the invention with its characteristic features is explained in greater detail using the drawings.

Shown are.

DETAILED DESCRIPTION OF THE PREFERRED EMBODIMENTS

Figure 1:
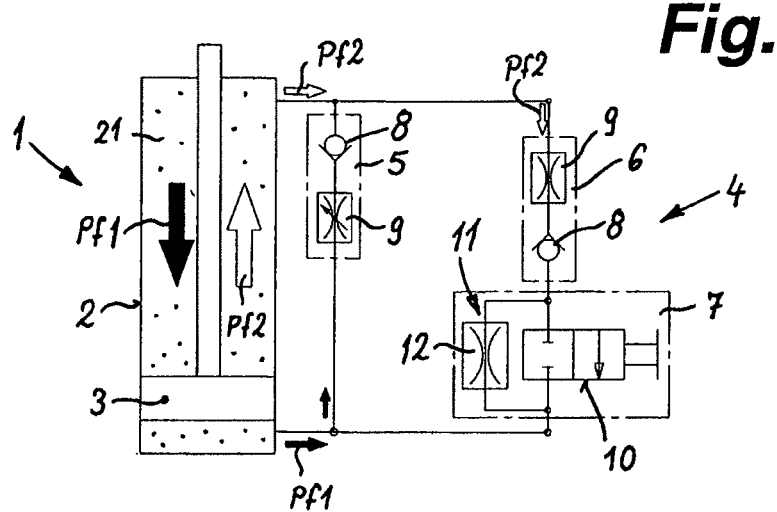
FIG. 1 is an operating diagram of a one-piston damping device with a compression stage damping system that can be blocked and a bypass channel switched parallel for locking.
Figure 2:
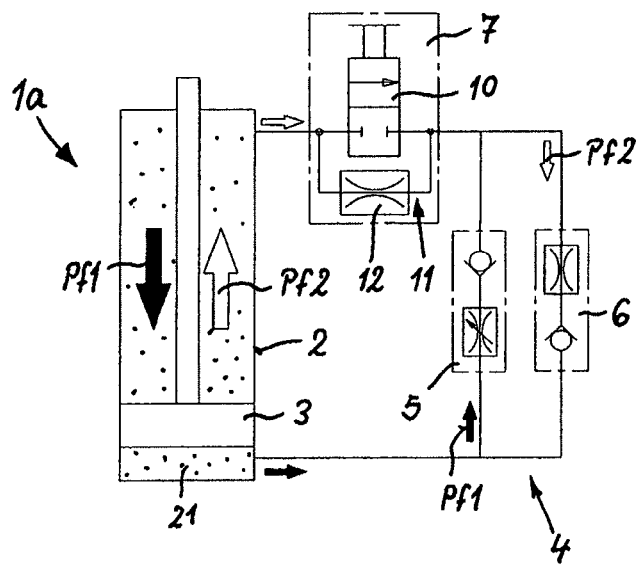
FIG. 2 is an operating diagram having a one-piston damping device and a compression stage damping system that can be locked, a traction stage damping system that can be locked and a bypass channel switched parallel to the lock.
Figure 3:
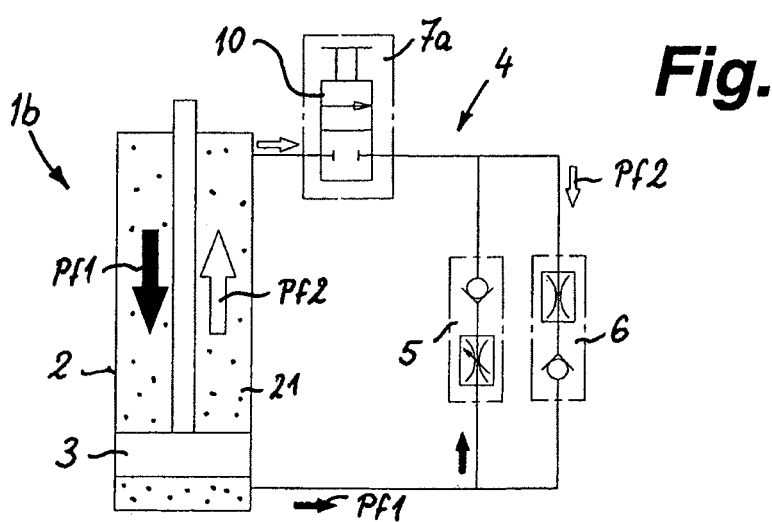
FIG. 3 is an operating diagram with a one-piston damping device and a blocking valve switched serial in reference to a parallel switch comprising a compression stage damping system and a traction stage damping system.

In FIGS. 1 through 3, the damping arrangements 1 through 1b are shown, which are provided with a one-piston damper having a piston 3 guided in a cylinder 2. The black arrows PF1 symbolize the motion and the oil flow during the rebound process (traction stage), while the white arrows PF2 symbolize the motion or the oil flow of the hydraulic oil 21 during the compression process (compression stage.)

A hydraulic circuit 4 is connected to the cylinder 2, which in FIG. 1 is provided with a traction stage damping system 5 and a lockout device 7. The lockout device 7 is arranged serially in reference to a compression stage damping system 6. The traction stage damping system 5 and the compression stage damping system 6 each include a non-return valve 8 and a throttle 9, with the throttle 9 of the traction stage damping system 5 being embodied in an adjustable fashion. The compression stage damping system 6 may also be adjustable, if necessary.

The lockout device 7, arranged in line in reference to the compression stage damping system 6, is provided with a path control valve 10 and a throttle 12 as a bypass channel 11 of said path control valve 10.

When the compression stage damping is locked by the valve 10, arranged serially, i.e. the path valve 10 is closed, the bypass 11 remains operational via the throttle 12. This bypass is designed such that although a very strong damping effect is given for the compression stage, yet via the throttle 12, a return of the spring fork into the so-called sag-position is possible. Due to the fact that the traction stage damping system 5 is arranged parallel in reference to the serial arrangement comprising a traction stage damping system 5 and the lockout device 7, the function of the traction stage damping system 5 remains unaffected.

FIG. 2 shows a damping arrangement 1a in which the traction stage damping system 5 and the compression stage damping system 6 are arranged parallel and in which the lockout device 7 is arranged serially in reference to that parallel arrangement. This provides the option, simultaneously, to lock both the traction stage damping system 5 as well as the compression stage damping system 6 (lockout). Likewise, the throttle 12 is provided as the bypass 11 parallel to the path valve 10, via which oil flow is still allowed to a small extent in order to cause an automatic return to a static compression position (SAG).

Finally, FIG. 3 shows a damping arrangement 1b, which is largely equivalent to the one shown in FIG. 2, with the lockout device 7a only comprising the path valve 10 and omitting the bypass 11. As soon as the path valve 10 is closed, the hydraulic circuit 4 is locked and, thus, also, the traction stage damping system 5 as well as the compression stage damping system 6. The spring fork provided with this damping arrangement 1b is then locked in its present state. However, there is also the chance to manually compress the spring fork when the path valve 10 is opened, and in this stronger compressed state, the path valve 10 is valve 10 is locked by closing it. In this manner, a simple climbing aid can be adjusted for the bicycle, for example.

Figure 4:
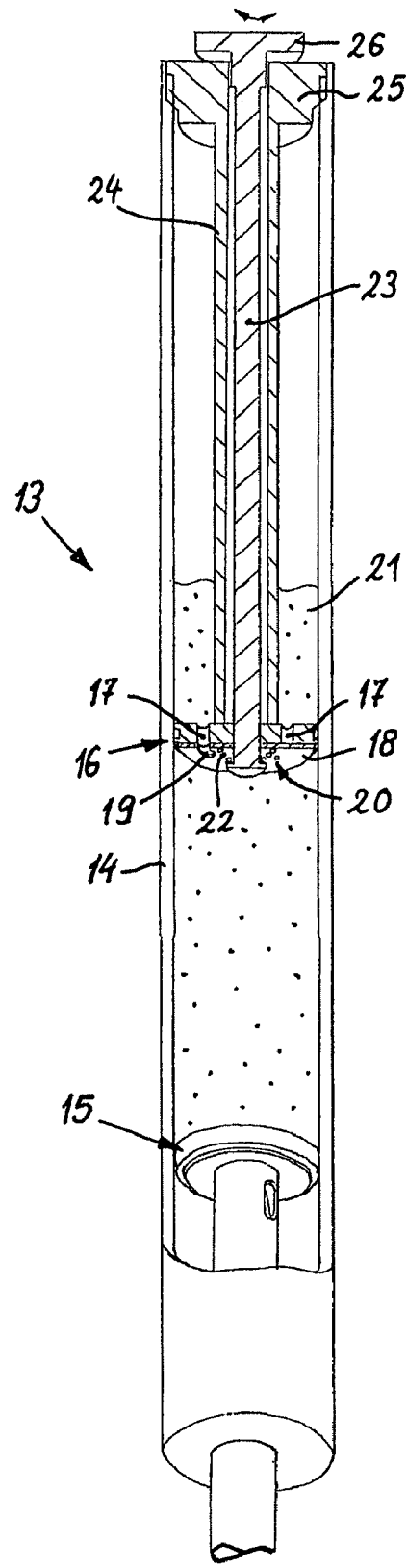
FIG. 4 is a partial longitudinal cross-sectional view of a damping leg of a spring fork having a fixed pressure stage piston and a compression stage damping system that can be blocked in an open position.
Figure 5:
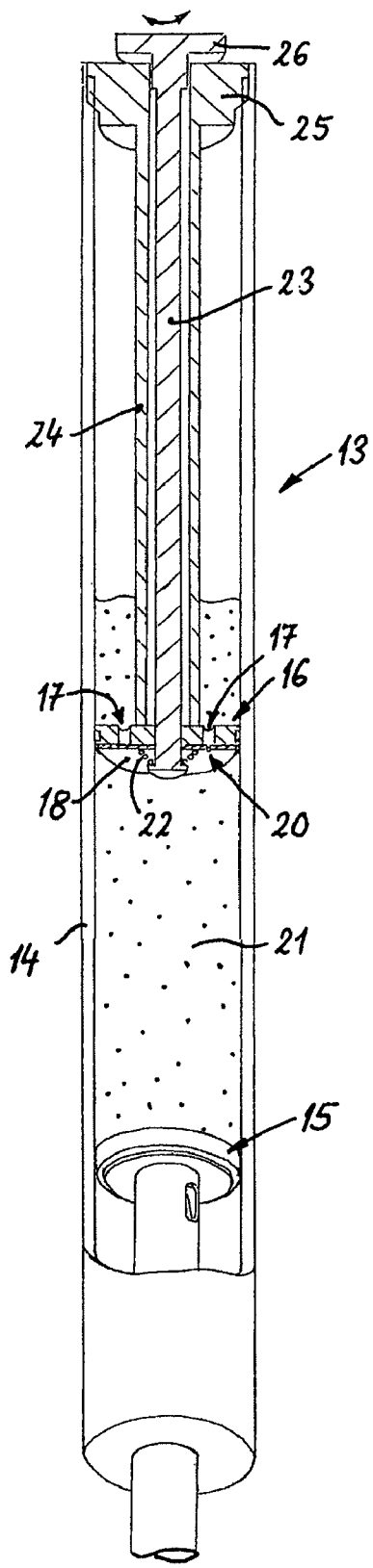
FIG. 5 is a view equivalent to FIG. 4, however, with the compression stage piston being in a locked position.

FIGS. 4 and 5 show a damping leg 13 of a spring fork, which is provided with the damping function described in FIG. 1, i.e. a compression stage damping system 6 that can be locked with a bypass 11.

The damping leg 13 is provided with a traction stage piston 15 guided in a cylinder 14 and a compression stage piston 16 arranged in a fixed manner. Above the traction stage piston 15, hydraulic oil 21 is discernible, marked by dots, in which the compression stage piston 16 is immersed.

The compression stage piston 16 has two connecting channels 17 penetrating therethrough. The compression stage piston 16 is provided with an adjustment disk 18 on its side facing the traction stage piston 15, with said disk 18 being rotational and provided with a penetrating opening 19 as well as a bypass bore 20 arranged off-set in the rotational direction in reference thereto according to the arrangement of the connection channels 17.

The adjustment disk 18 is pressed against the bottom of the compression stage piston 16 by a pressure spring 22.

In the rotary position of the adjustment disk 18 shown in FIG. 4, the penetrating opening 19 overlaps a connection channel 17. In this opened position, the hydraulic oil 21 can flow unhindered through the penetrating opening 19 and the connection channel 17 when the spring fork is compressed.

In FIG. 5, the compression stage piston 16 is shown in a closed position, with the adjustment disk 18 being in a rotational position in which the connection channel 17 is covered and thus closed, while the bypass bore 20 overlaps another connection channel 17. This way, the compression stage damping system 6 is blocked except for a defined bypass (provided) by the bypass bore 20. This reduces the rocking motion of the suspension by movements of the rider, and the fork can lower to the so-called sag position, i.e. the operational position, which adjusts to approximately 20 to 30 percent of the total spring travel when the rider is seated.

When rebounding, i.e. when the traction stage piston 15 is moved downward, the flow of hydraulic oil 21 lifts the adjustment disk 18 against the pressure spring 22 off the compression stage piston 16 such that the damping lock for the compression stage has no influence on the traction stage.

In order to rotate the adjustment disk 18, it is connected to a rotary shaft 23 in a torque-proof manner, yet displaceable in the longitudinal direction. At the upper end of the cylinder, the compression stage piston 16 is connected to a fastener 25 via a tube 24. The rotary shaft 23 penetrates this tube 24 and is provided at the upper end with a rotary knob 26 or a similar rotational handle, via which the adjustment disk 18 can be distorted. Snapping devices, not shown here, define the open and the closed positions.

Figure 6:
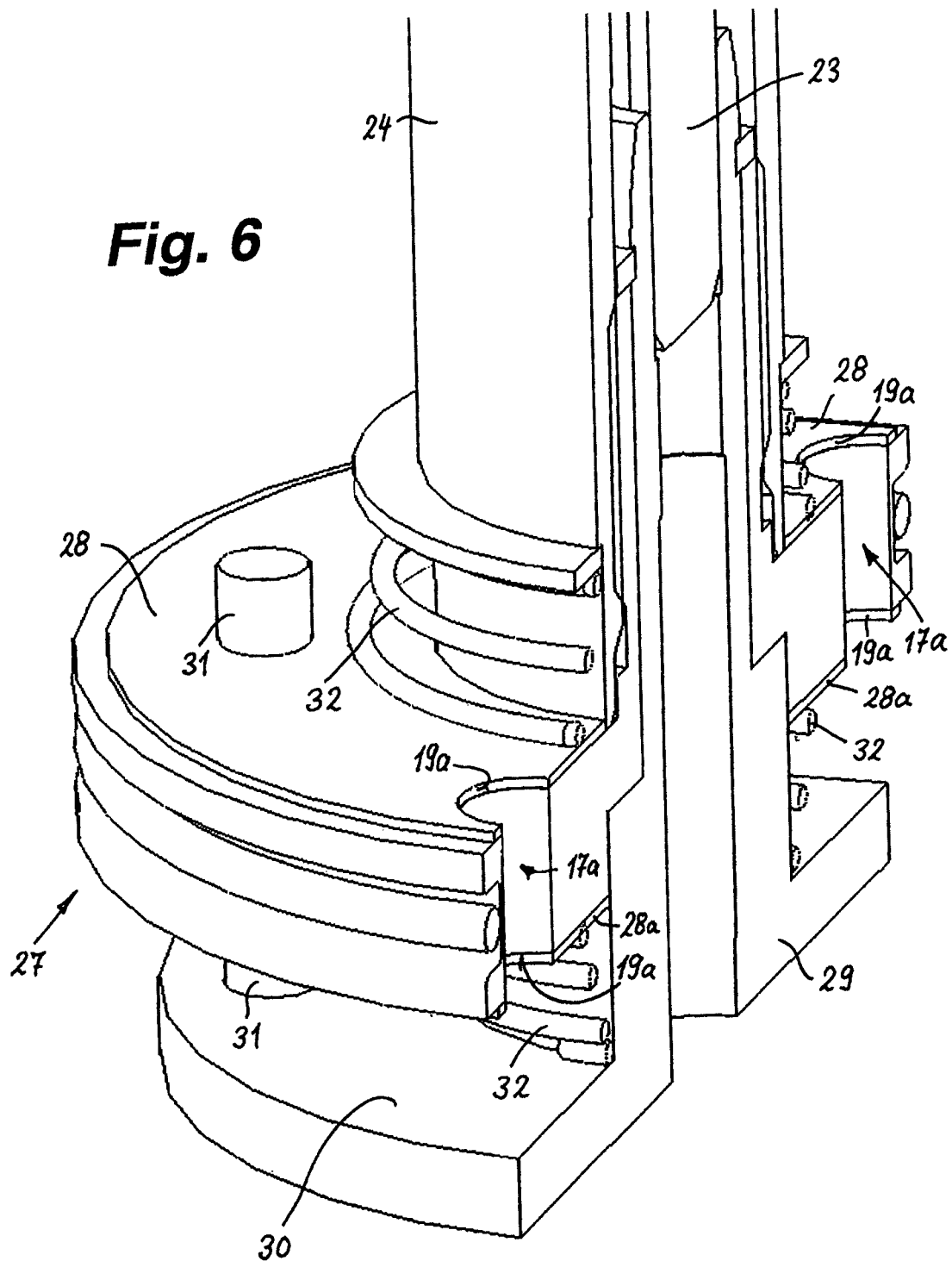
FIG. 6 is a longitudinal cross-sectional view of a lock-out piston in a perspective view and an open position.
Figure 7:
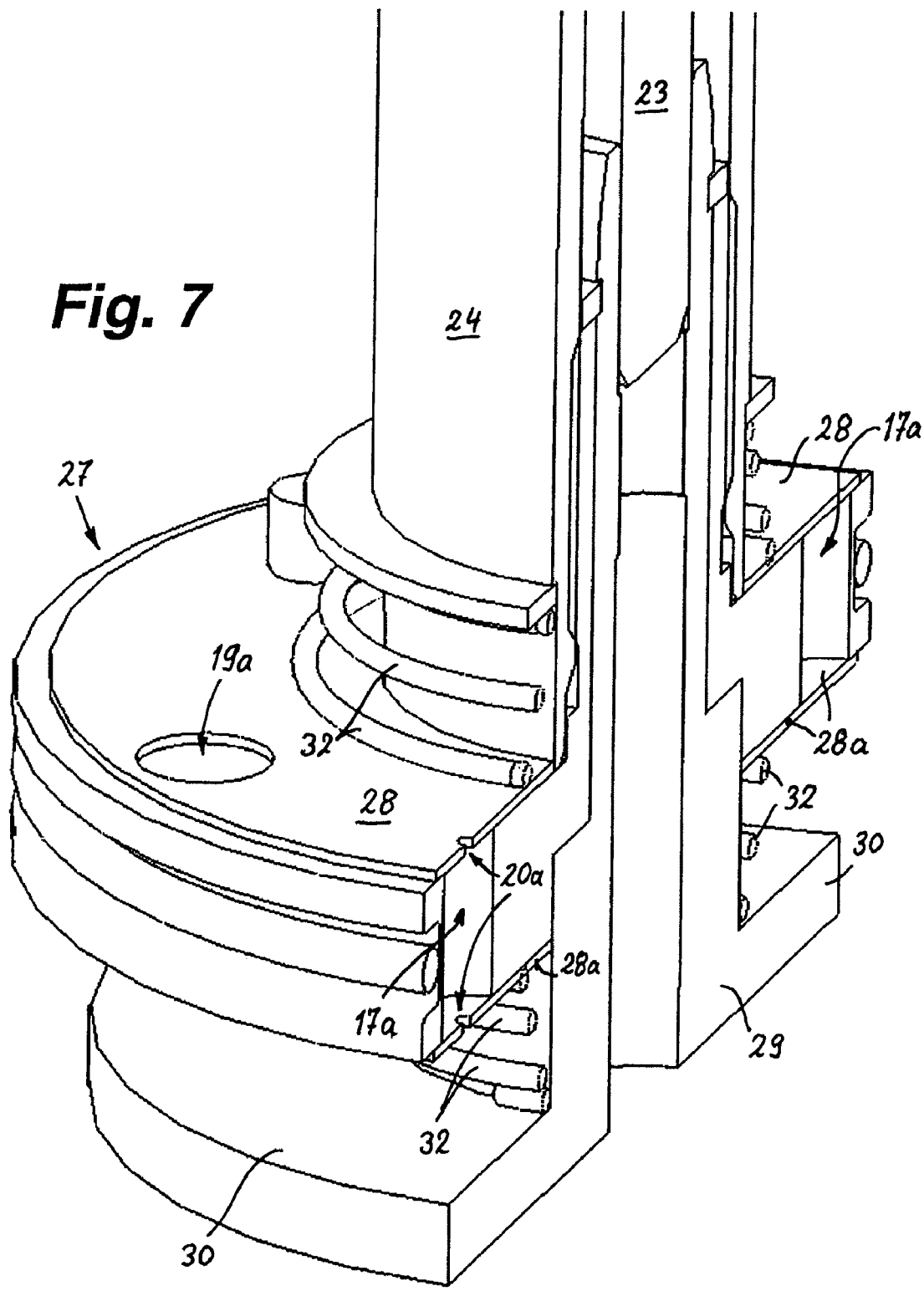
FIG. 7 is a view similar to FIG. 6, however, in a blocked position of the lockout piston.

FIGS. 6 and 7 show a practical exemplary embodiment for the damping arrangement 1a shown in FIG. 2. Here, both the compression stage damping system 6 as well as the traction stage damping system 5 can be blocked maintaining the bypass channel.

In addition to the compression stage piston 16 the lockout piston 27 shown in FIGS. 6 and 7 may be provided in a damping arrangement 1 having a mobile traction stage piston and a fixed compression stage piston. For example, in an arrangement similar to the one shown in FIGS. 4, 5, it could be arranged slightly above or below the piston exclusively embodied as a compression stage piston 16 and connected to the tube 24. Comparable parts in FIGS. 6 and 7 are therefore provided with equivalent reference characters, with this relating to the fastener 25 and also the drive transmission.

The lockout piston 27 is provided at both sides with washers 28, 28a impinging and rotational in reference to the piston 27. They are provided with penetrating openings 19a located diametrically opposite, which are positioned in FIG. 6 overlapping the connection channels 17a in the lockout piston 27. In FIG. 6, the open position of the lockout piston 27 is shown.

Both washers 28, 28a are rotated jointly, and, for this purpose, an actuator 29 is provided at the interior end of the rotary shaft 23, which at the bottom end has a radial flange 30, which carries an entraining pin 31. This entraining pin 31 engages the washers 28, 28a over the course of their radial extension and engages the piston 27 within the partial circumferential slot located within the piston 27.

The two washers 28, 28a are impinged towards the piston 27 by pressure springs 32, with no lifting function of the washers 28, 28a being provided. Rather, the pressure springs 32 exclusively serve to compress the adjustment disks to the piston.

The upper washer 28 is allocated to a traction stage and, thus serves to control the flow of hydraulic oil 21 during rebound, while the lower washer 28a serves for the flow control in the compression stage, thus during the compression of the fork.

The actuator 29 is connected to the rotary shaft 23 embodied as a multi-sided shaft, by which the washers 28, 28a are rotational into the lockout position (FIG. 7) or the open position (FIG. 6). In the lockout position, one connection channel 17a is completely closed, while the other connection channel 17a remains passable via bypass bores 20a in the washers 28, 28a. In this lockout position of the washers, both the traction stage damping system 5 as well as the compression stage damping system 6 are largely blocked, with an automatic adjustment to the so-called sag-level being possible by the bypass formed by the bores 20a.

The invention claimed is:

1. A spring fork comprising:
a cylinder;
a compression stage piston arranged in the cylinder in a fixed manner, with first and second cylinder chambers located in the cylinder on both sides of the compression stage piston and holding hydraulic medium;
a traction stage piston moveable in the cylinder, with the second cylinder chamber defined between the compression stage piston and the traction stage piston, with movement of the traction stage piston towards the compression stage piston compressing the hydraulic medium in the second cylinder chamber;
at least one connection channel extending through the compression stage piston and connecting the first and second cylinder chambers for the hydraulic medium to flow; and
an adjustment device movable with respect to the compression stage piston, with the adjustment device including a penetrating opening and a bypass bore with a cross-section reduced from a cross-section of the penetrating opening, with the adjustment device movable relative to the compression stage piston to align one of the penetrating opening and the bypass bore with the at least one connection channel connecting the first and second cylinder chambers, wherein a side of the compression stage piston facing the traction stage piston is covered by the adjustment device in a form of a washer rotational relative to the compression stage piston and spring-loaded against the compression stage piston, wherein the washer is provided with the penetrating opening and the bypass bore having different cross-sections and overlapping with the at least one connection channel by rotating the washer.

2. A spring fork according to claim 1, wherein the penetrating opening and the bypass bore are arranged in the adjustment device to be alternately opened or closed by the compression stage piston.

3. A spring fork according to claim 1, wherein the compression stage piston is connected via a tube to a fastener located at an upper end of the cylinder, and wherein a rotational shaft penetrating the tube and the compression storage piston is provided with a rotational handle at an exterior end and at an interior end is connected to the washer in a torque-proof manner, with the rotational shaft displaceable in a longitudinal direction.

4. A spring fork comprising:
a cylinder;
a compression stage piston arranged in the cylinder in a fixed manner, with first and second cylinder chambers located in the cylinder on both sides of the compression stage piston and holding hydraulic medium;
a traction stage piston moveable in the cylinder, with the second cylinder chamber defined between the compression stage piston and the traction stage piston, with movement of the traction stage piston towards the compression stage piston compressing the hydraulic medium in the second cylinder chamber;
at least one connection channel extending through the compression stage piston and connecting the first and second cylinder chambers for the hydraulic medium to flow; and
an adjustment device movable with respect to the compression stage piston, with the adjustment device including a penetrating opening and a bypass bore with a cross-section reduced from a cross-section of the penetrating opening, with the adjustment device movable relative to the compression stage piston to align one of the penetrating opening and the bypass bore with the at least one connection channel connecting the first and second cylinder chambers, wherein the adjustment device comprises two rotational washers impinging the compression stage piston at both sides and rotational relative to the compression stage piston, wherein the rotational washers are rotated to overlap the at least one connection channel in the compression stage piston and each includes the penetrating opening and the bypass bore.

5. A spring fork according to claim 4, wherein a rotational shaft is connected to rotate the two rotational washers at an interior end, with the rotational shaft having an entraining pin connected to the two rotational washers for rotating the two rotational washers.

6. A spring fork according to claim 5, wherein the entraining pin penetrates the two rotational washers in a progression of a radial extension thereof and the compression stage piston within a partial circumferential slot located in the compression stage piston.

7. A spring fork according to claim 6, wherein the two rotational washers are spring-loaded towards the compression stage piston.

8. A spring fork according to claim 4, wherein an overall cross-section of the bypass bore for resetting from a maximum position into a normal position is sized for a time ranging from approximately 1 to approximately 10 seconds.

* * * * *